March 8, 1938.                A. M. STARR                2,110,405
             FLUID METERING AND DISTRIBUTING SYSTEM
                Filed March 23, 1936        2 Sheets-Sheet 1
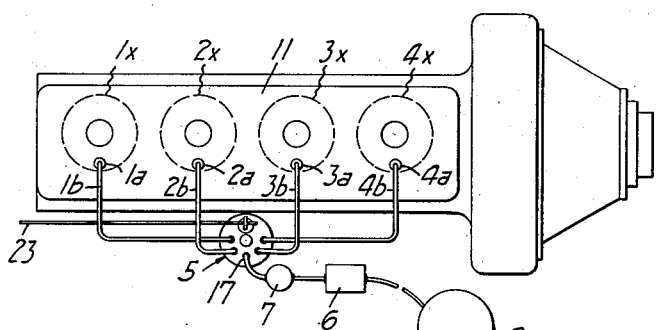
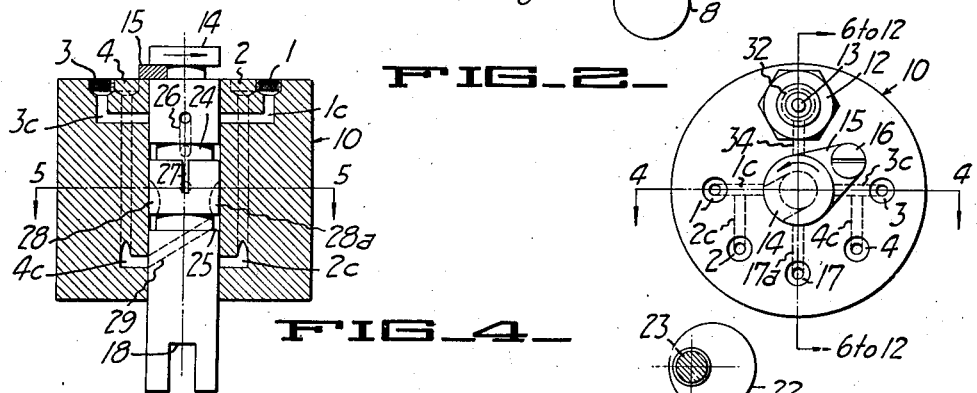
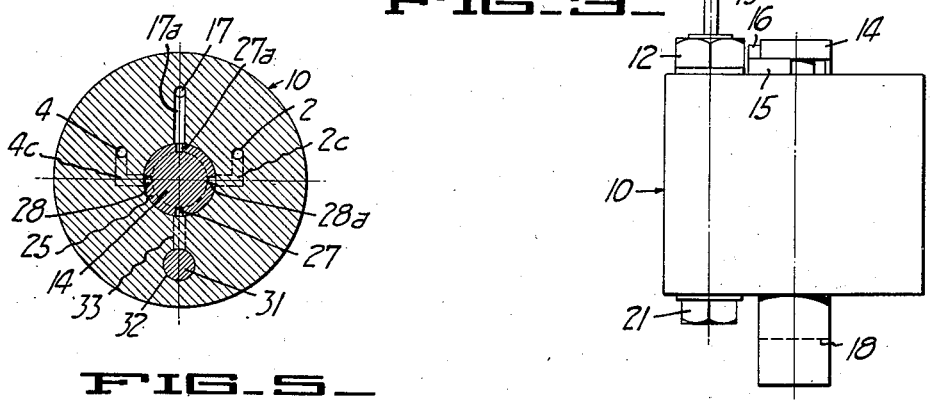
INVENTOR.
Allan M. Starr
BY
ATTORNEY.

March 8, 1938.  A. M. STARR  2,110,405
FLUID METERING AND DISTRIBUTING SYSTEM
Filed March 23, 1936  2 Sheets-Sheet 2
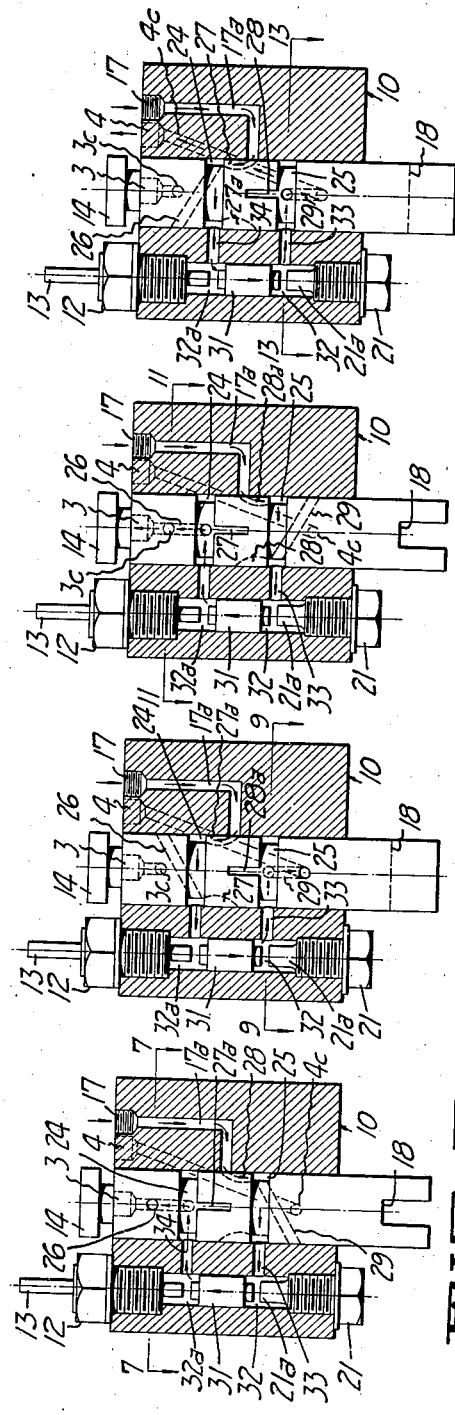
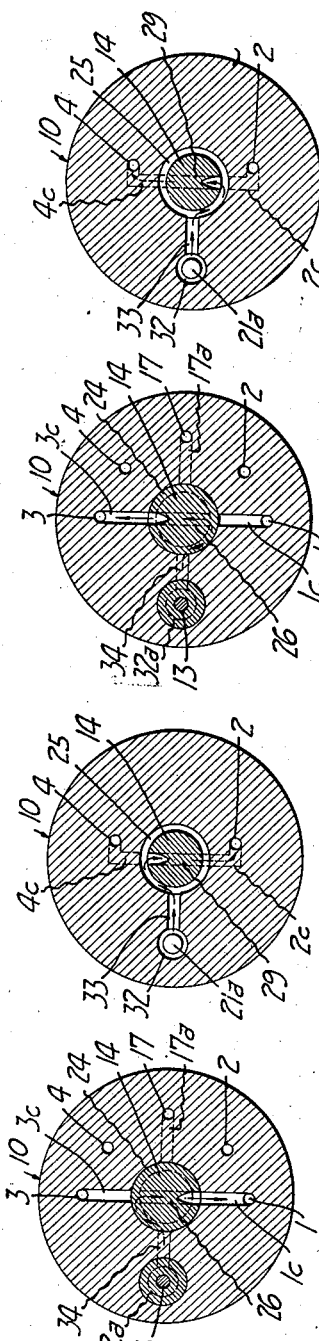
INVENTOR.
Allan M. Starr
BY
ATTORNEY.

Patented Mar. 8, 1938

2,110,405

UNITED STATES PATENT OFFICE 2,110,405

FLUID METERING AND DISTRIBUTING SYSTEM

Allan M. Starr, Piedmont, Calif., assignor, by mesne assignments, to Starr & Sweetland, a co-partnership composed of Ernest J. Sweetland and Allan M. Starr, as co-partners, Piedmont, Calif.

Application March 23, 1936, Serial No. 70,338

2 Claims. (Cl. 123—138)

This invention relates to means for metering and distributing fuel to the cylinders of internal combustion engines and is particularly designed for use in engines of the fuel injection type.

An object of my invention is to provide a metering and distributing unit which is simple in construction and positive in operation. Fuel for internal combustion engines of the fuel injection type is customarily delivered to the injector nozzles in the cylinders or combustion chambers (or intake manifold) thereof at very high pressure which may be 1,000 pounds per square inch or more in certain cases. When fuel oil is handled under such high pressure it is desirable to make the distance between the distributor element and the metering element as short as possible because where these elements are separated by any considerable distance and connected by tubular conduits, the results are influenced by inertia of fuel within the conduits, by the slight compressibility of fuel, and by various other factors. By the construction employed in my invention I entirely eliminate lengthy conduits between the distributor and metering elements and assemble the units in a single compact block which not only is capable of accurate metering and distribution at very high speeds but eliminates many of the objections found in metering and distributing systems heretofore devised, as will be understood by reference to the drawings.

The invention possesses other advantageous features, some of which with the foregoing, will be set forth in the following description where the forms of the invention which have been selected for illustration in the drawings accompanying and forming a part of the present specification are outlined in full. However, I do not confine my invention to the specific forms set forth in the drawings and specification nor to the specific uses of the invention herein set forth, as it is capable of many modifications which are limited only by the scope of the appended claims.

Referring to the drawings:

Figure 1 diagrammatically represents a plan view of a four cylinder engine wherein my distributing and metering system is employed.

Figure 2 shows an exterior plan view of the invention.

Figure 3 is a side elevation of the device shown in Figure 2 together with an eccentric means of controlling the amount of fuel metered at each charge.

Figure 4 is a vertical sectional elevation taken on the lines 4—4 of Figure 2.

Figure 5 is a horizontal section taken on the lines 5—5 of Figure 4.

Figures 6, 8, 10, and 12 are vertical sections taken on the line 6—to—12 of Figure 2.

Figure 7 is a horizontal section on the line 7—7 of Figure 6.

Figure 9 is a horizontal section on the line 9—9 of Figure 8.

Figure 11 is a horizontal section on the line 11—11 of Figure 10.

Figure 13 is a horizontal section on the line 13—13 of Figure 12.

Briefly the invention consists of a housing in which is mounted a rotary valve plug and a metering chamber containing a metering piston. An adjustable stop is provided to control the length of stroke of the metering piston. This piston is an accurately ground fit in the metering chamber, dividing it into two sections and the displacement caused by the reciprocating movement of the piston governs the size of each fuel charge. The rotary valve serves the purpose of admitting fuel under high pressure, first to one end of the metering chamber and then the other, thus causing the piston to reciprocate. The fuel entering one end of the chamber forces the piston to the opposite end and expels the charge of fuel therefrom; then when the valve reverses the flow of fuel and admits it to the end of the chamber that has just been emptied, the piston returns to its former position, forcing the fuel charge out of the end just filled. The size of the fuel charge is governed by the length of stroke of the metering piston which, in turn, is governed by the position of the adjustable stop. The valve plug which alternately admits fuel to opposite ends of the metering chamber serves the additional purpose of distributing the fuel to conduits leading to the injector nozzles in the engine cylinders. This is accomplished by a series of ports and conduits in the valve plug and housing as will be understood by reference to the drawings and the following description.

The object of Figures 6 to 13 inclusive is to indicate by the arrows thereon the direction of flow of the fuel at various positions assumed by the moving parts of the device during its cycle of operations. The drawings and description in this application illustrate the use of my invention in connection with a four cylinder internal combustion engine but the same principle may be applied for metering and distributing fuel to any number of cylinders as will be understood by those skilled in the art.

Referring to Figure 1, the numeral 5 represents the metering and distributing apparatus as a whole, 11 represents a cylinder block of an engine and 1a, 2a, 3a, and 4a are injector nozzles of any approved type, preferably the spring-loaded type, which inject into the cylinder only when receiving fuel at a pressure sufficient to overcome the spring tension which normally holds a valve in the nozzle in closed position. 1b, 2b, 3b, and 4b represent conduits which are for the purpose of delivering fuel from the apparatus 5 to the engine cylinders 1x, 2x, 3x, and 4x respectively; it being understood that the present description applies to a 4 cycle engine and that the firing order in this instance is 1, 2, 4, 3. 6 is a fuel pump which delivers the fuel under pressure into a pressure tank or accumulator 7 from the fuel storage tank 8.

In Figure 2, 12 is the head of a screw which forms a closure for the metering chamber and 13 is a rod which is a ground fit through the center of the screw 12 and is used for the purpose of regulating the stroke of the metering plunger as will be explained in detail further on. 14 is the top of the rotatable distributing element, or valve plug, which is securely held against longitudinal movement by the slotted member 15 which is held in place by the screw 16, it being understood that the slot in the part 15 allows sufficient clearance to permit the free rotation of the element 14. The numerals 1, 2, 3, and 4 in Figure 2 designate the outlets of the distributor casing which are connected by the conduits 1b, 2b, 3b, and 4b to the cylinders 1x, 2x, 3x, and 4x.

Each of the outlets 1, 2, 3, and 4 is connected by a lateral conduit to the central aperture of the casing block as indicated by the dotted lines 1c, 2c, 3c, and 4c, it being understood that the conduit 2c connects to the central aperture through a radial branch conduit in the same vertical plane as conduit 1c but at a lower level, and that the conduit 4c connects with the central aperture through a radial conduit directly below the conduit 3c. 17 is the fuel inlet which brings the supply of fuel under pressure from the accumulator 7.

In Figure 3 an elevation of the housing 10 is shown with the lower end of the central rotatable plug member 14 extending through the housing. The lower end of 14 is provided with a slot extending to the line 18. The purpose of the slot 18 is to receive a drive shaft which is geared to the engine in such manner as to cause the element 14 to make one revolution for each two revolutions of the crank shaft of the engine in the case of a 4-cycle engine. The screw 21 forms a closure for the lower end of the metering chamber and the upper end of this screw is ground flat to form a stop for the metering plunger as is indicated at 21a in Figure 6. It will be noted that the upper end of screw 21 is reduced in diameter to provide an annular space forming a part of chamber 32. This annular space is of such size as to make the cubic contents of chambers 32 and 32a substantially equal under average running conditions, whereby compressibility of fuel has the same effect in both chambers and therefore does not adversely affect metering. In Figure 3 the rod 13 which limits the travel of the metering plunger is clearly shown, and contacting with the outer end of this rod is the eccentric 22 which is fixed to the shaft 23. Partial rotation of shaft 23 and eccentric 22 regulates the position of the rod 13 and governs the stroke of piston 31 (Fig. 6) and the amount of fuel metered in each charge. The shaft 23 is connected to a throttle lever or governor by any convenient means (not shown).

The sectional view Figure 4 which is taken on the line 4—4 of Figure 2, shows the casing 10, the central rotating element 14 and certain of the conduits for the distribution of fuel. This view which cuts through the conduits 1 and 3 shows the radial conduits 1c and 3c by means of which the openings 1 and 3 connect with the central aperture; and the conduits 2c and 4c connecting openings 2 and 4 with the central aperture at a lower level. The valve plug 14 which is an accurately ground fit in the central aperture of the block 10 is provided with circumferential grooves 24 and 25. The groove 24 is in open communication with the conduit 26 which alternately connects the groove 24 with conduits 3c and 1c during the rotation of the valve plug. Also communicating with the groove 24 are a pair of oppositely disposed longitudinal grooves, one of which is shown at 27. These grooves during rotation of the valve plug 14 alternately communicate with conduit 17a (see Fig. 2) which is the inlet for fuel under pressure into the spaces within the valve plug.

The valve plug 14 contains another pair of longitudinal grooves or slots 28 and 28a. These are set at right angles to the grooves 27 and 27a and are in open communication with the circumferential groove 25. It should be noted that the length of the grooves 27, 27a, 28 and 28a is such that they overlap at the line 5—5 of Figure 4 so that in the rotation of the valve plug 14 each of these longitudinal slots in turn gets into communication with the fuel inlet opening 17a (see Fig. 2) whereby the fluid pressure in 17a is alternately, and at 90° intervals, connected with peripheral grooves 24 and 25.

The angular passageway 29 is in open communication with the peripheral groove 25 so that during the rotation of the plug 14 the peripheral groove 25 is alternately brought into communication with the conduits 2c and 4c which lead to injector nozzles. The functions of the parts shown in Figures 2 and 4 will be more clearly understood by reference to the succeeding figures and description.

Figure 5 which is a horizontal section on the line 5—5 of Figure 4 shows the position of the ducts or slots 27, 27a, 28, 28a and certain of the conduits through the housing 10. This view also shows the metering piston 31 in section and it should be understood that this plunger is an accurately ground fit in the casing so as to prevent leakage of fuel between the metering piston and the walls enclosing it. Piston 31 is sometimes referred to as a movable partition.

Figure 6 shows the metering plunger 31 during its upstroke. In this and the succeeding views the eccentric 22 which limits the outward travel of rod 13 is omitted; but it will be understood that the pressure of fuel within the metering chamber constantly urges the rod 13 outwardly and thereby keeps it firmly bearing against the eccentric 22 (Figure 3). From the description thus far it will be understood that the metering and distributing apparatus consists of a casing 10 having a central aperture, which is an accurately ground fit to receive the valve plug 14; this plug is caused to rotate at the rate of one revolution for each two revolutions of the 4 cycle engine crank shaft; and that the valve plug and casing form a closely ground and lapped fit to prevent leakage or passage of fuel except through the ports provided for that purpose. Also, that since the metering piston 31 is also a lapped and ground fit in the metering chamber, the plunger 31 will reciprocate back and forth between the face 21a and the lower end of the rod 13 in accordance with the differential in fuel pressure in the respective metering chambers which are designated by the numerals 32 and 32a. It is therefore obvious that if the pump 6 and accumulator 7 constantly maintain a high fluid pressure through the conduit 17a, and this fluid pressure is alternately connected with chambers 32 and 32a by means of ports in the rotating valve plug 14; that the metering plunger 31 will be caused to reciprocate back and forth with each alternation of pressure at the respective ends of the piston 31; and also that the length of travel of the piston 31, and consequently the amount of fuel admitted at each stroke, will be governed by the position of the rod 13 which in turn is regulated by the eccentric 22. And further, that each stroke of the piston 31 forces the metered fuel out of one of the chambers 32 or 32a at the end of the piston, and that the fuel thus forced out is led in turn to an engine cylinder in accordance with the firing order of these cylinders, as will be understood by a study of the succeeding figures and following description.

The arrows in the conduits in Figure 6 and Figure 7 indicate that the pressure of fuel has entered through the conduit 17a, has been admitted through the port 28 into the groove 25 from which it passes directly through the passageway 33 into the chamber 32 and forces the piston 31 to its upward position, driving the fuel out of the chamber 32a through the passageway 34 into the groove 24 and thence outwardly through the conduit 26 which in this position of the valve plug is in registration with conduit 1c, which leads to the pipe 1b and nozzle 1—a into cylinder 1x of the engine.

Referring to Figures 8 and 9, the valve plug 14 has advanced 90° from the position shown in Figure 6 and in this position represents the fuel under pressure entering through conduit 17a passing through port 27a into the groove 24 which places it in direct communication with the chamber 32a through conduit 34, forcing the piston 31 downwardly and thus forcing a metered charge of fuel through the conduit 33 into the groove 25 and out through conduit 29 which at this point is in registration with conduit 2c whence the fuel is forced through the conduit 2b and injector nozzle 2a into the cylinder 2x of the engine.

In Figures 10 and 11 the valve plug 14 has advanced another 90° and in this position the fuel has entered through conduit 17a into the port 28a and groove 25 which has led it directly into chamber 32 forcing the piston 31 upwardly to discharge the fuel out of chamber 32a into groove 24, thence through the conduit 26 which at this point is in registration with conduit 3c to lead the fuel through conduit 4b and injector nozzle 4a into cylinder 4x.

In Figures 12 and 13 the valve plug has advanced another 90° admitting the fuel through 17a, through port 27 into groove 24 from which it passes through the port 34 into the chamber 32a forcing the piston 31 downwardly to expel a charge of fuel through the conduit 33 into groove 25 then downwardly through port 29 which is now in registration with conduit 4c whence the fuel is led through conduit 3b and injector nozzle 3a into the cylinder 3x of the engine.

The next advance of 90° of the valve plug 14 carries it back to the position illustrated in Figures 6 and 7 and the cycle is repeated.

I have found the metering device above described to be inexpensive in construction, accurate in metering and effective in operation. I have found this construction particularly adapted for high speed engines because of its compactness; lightness of moving parts and the shortness of conduits required for connecting the various ports and chambers, whereby the effects of compressibility of fuel and inertia are equalized as far as possible and reduced to a minimum.

While I have in this application used a metering piston that slides back and forth between the chambers 32 and 32a, it is within the province of my invention to supplant the piston 31 with any device such as a diaphragm which in effect serves the purpose of a movable partition, the movement of which is controlled to vary the displacement of fuel affected within chambers 32 and 32a.

While I have illustrated and described my metering and distributing system in connection with injector nozzles which are assumed to be mounted in the cylinders or combustion chambers of internal combustion engines, the device is equally applicable for use in cases where it may be desired to inject the fuel, whether volatile or otherwise, into any desired part of the intake manifold of an engine.

My apparatus may be used in connection with 2-cycle engines if desired by changing the rate of rotation of the valve and other changes that will be obvious to those skilled in the art.

The ports or passageways in the valve mechanism may be referred to as "inlet ports" or "inlet passageways"; or "outlet ports" or "outlet passageways" according to whether they admit fluid to the metering chambers or provide exit therefrom.

I claim:

1. A mechanism for metering a fluid comprising a casing having a pair of substantially parallel chambers of circular cross section, a metering piston slidably mounted in one of said chambers and a closure at each end thereof; means for controlling the stroke of said piston; a rotary valve plug in the other of said chambers; a pair of transverse conduits connecting said parallel chambers adjacent each end of said slidably mounted piston; a pair of circumferential grooves in said rotary valve plug, each one in communication with one of said transverse conduits; a feed conduit leading through said casing and communicating with said valve plug; a plurality of feed ducts in said valve plug certain of which ducts communicate with one of said circumferential grooves while the other ducts intermediate thereof communicate with the other of said circumferential grooves; said feed ducts having communication with said feed conduit during the rotation of said valve plug; said ducts being alternately disposed so that each of said circumferential grooves is alternately brought into communication with said feed conduit during the rotation of said plug; a plurality of fluid outlet ports in said casing; passageways through said valve plug communicating with each circumferential groove and each communicating with an outlet port during each rotation of said valve plug; pump means to force a fluid through said feed conduit and associated passageways.

2. Means for metering fluids comprising a casing; a cylindrical bore through said casing; a valve plug rotatably mounted in said bore; a pair of circumferential grooves in said plug; a feed conduit through said casing terminating in a feed port intermediate of said circumferential grooves; a plurality of slots in said valve plug each having intermittent communication with said feed port and with one of said grooves, alternate slots communicating with the upper groove and intermediate slots communicating with the lower groove; a secondary cylindrical bore in said casing; a piston in said secondary bore; adjustable means to govern the stroke of said piston; a metering chamber at each end of said piston; a conduit leading from one of said chambers to the first mentioned bore to communicate with the upper circumferential groove and a conduit leading from the other chamber to the lower circumferential groove; a plurality of outlet ports intermittently communicating with said circumferential grooves; said ports being placed to open communication between an outlet port and said upper groove when the feed port is in registry with a slot connected with the lower groove, and to open communication between an outlet port and said lower groove when a slot connected with said upper groove is in registry with said feed port.

ALLAN M. STARR.